United States Patent Office 3,445,222
Patented May 20, 1969

3,445,222
HERBICIDAL COMPOSITIONS CONTAINING TRISUBSTITUTED-PHENYL N-METHYLCARBAMATES
Albert H. Haubein, Newark, Del., assignor to Hercules Incorporated, Wilmington, Del., a corporation of Delaware
No Drawing. Original application June 23, 1964, Ser. No. 377,384, now Patent No. 3,391,180, dated June 2, 1968. Divided and this application Nov. 8, 1967, Ser. No. 681,579
Int. Cl. A01n 9/20, 5/00
U.S. Cl. 71—106   10 Claims

ABSTRACT OF THE DISCLOSURE

The compositions contain compounds which are of the class of substituted-phenyl N-methylcarbamates, a representative compound being 2-t-butyl-6-methallyl-4-methylphenyl N-methylcarbamate. The compositions are useful in the pre-emergence control of crabgrass.

---

This application is a division of copending application Serial No. 377,384, filed June 23, 1964, now U.S. Patent No. 3,391,180 issued June 2, 1968.

This invention relates to certain novel compounds, which may be broadly described as being substituted-phenyl N-methylcarbamates, and to herbicidal compositions containing these new compounds. More specifically, the invention relates to herbicidal compositions which are selective for the pre-emergence control of crabgrass.

Many substances, both inorganic and organic, have been proposed and used as herbicides, but the problem of controlling undesirable plant growth still remains. Selectively controlling undesirable plant growth is important not only in farming but also in gardening and in the establishment of fine lawns. Particularly in the latter, it is desirable to control the many varieties of grass-type weeds. Although a large number of herbicides have heretofore been used and have exhibited varying degrees of success in different applications, the problem of selectively controlling grass-type weeds has been a troublesome problem.

The art has long known of herbicidally active materials such as 2,4-dichlorophenoxyacetic acid, 2,4,5-trichlorophenoxyacetic acid, their salts and esters, and compounds such as pentachlorophenol and 2,2-dichloropropionic acid. These materials have, in many instances, been satisfactory in specific applications, but, in other instances, they have been insufficiently selective, and this has resulted in the killing of both desirable and undesirable plant growth. In so far as undesirable grass-type weeds are concerned, a material has recently been developed which is an effective pre-emergence herbicide for crabgrass. This material is dimethyl-2,3,5,6-tetrachloroterephthalate.

Now, in accordance with the present invention, certain substituted-phenyl N-methylcarbamates have been discovered which also are selective in that they are pre-emergence herbicides for crabgrass. Representative of these carbamates are 2-t-butyl-6-methallyl-4-methylphenyl N-methylcarbamate, 2-t-butyl-6-isobutenyl-4-methylphenyl N-methylcarbamate, 2-t-butyl-6-methallyl-4-methoxyphenyl N-methylcarbamate, 2-t-butyl-4-chloro-6-methallylphenyl N-methylcarbamate, 4-bromo-2-t-butyl-6-isobutenylphenyl N-methylcarbamate, and the corresponding 2-t-amyl compounds such as 2-t-amyl-6-methallyl-4-methylphenyl N-methylcarbamate, in which the t-amyl group is substituted for the t-butyl group. These compounds have the structural formula

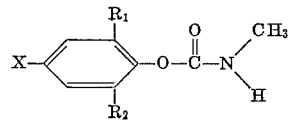

where $R_1$ is an alkyl group selected from the group consisting of t-butyl and t-amyl, $R_2$ is an alkenyl group selected from the group consisting of methallyl and isobutenyl, and X is a substituent selected from the group consisting of $CH_3$—, $CH_3O$—, Cl—, and Br—. These compounds are tolerated to a high degree by desirable plants and established turf grasses such as Kentucky Bluegrass, Penncross bent grass, and chewings fescue. On the other hand, these compounds will give complete kill of seedlings of crabgrass and yellow foxtail. It also is true that these compounds are detrimental to seedlings of desirable turf grasses, but by proper selection of time of application, as is also necessary in the case of dimethyl-2,3,5,6-tetrachloroterephthalate, it is possible to obviate damage to such seedlings.

The significant feature of the present invention is the ability of the new carbamates to act as pre-emergence herbicides against crassgrass without harming other desirable vegetation. The compounds are readily prepared by reaction of the corresponding phenols with methylisocyanate. For example, the reaction of 2-t-butyl-6-methallyl-4-methylphenol with methylisocyanate leads to 2-t-butyl-6-methallyl-4-methylphenyl N-methylcarbamate. Preparation of the compounds and of herbicidal compositions containing them and evaluation of the herbicidal compositions are more fully set forth in the following examples in which all parts and percentages are by weight unless otherwise specified.

Example 1

To 165 parts of 2-t-butyl-6-methallyl-4-methylphenol dissolved in 303 parts of toluene was added 7.3 parts of triethylamine. To the resulting solution there was added a solution of 58.5 parts of methylisocyanate in 49.4 parts of toluene. The reaction mixture was stirred and heated for four hours at 50° C., and it was subsequently permitted to cool by standing overnight at room temperature. The reaction mixture then was consecutively washed with water, with aqueous 5% sodium hydroxide solution, and with water. The washed mixture was dried over anhydrous sodium sulfate, and the toluene then was removed by distillation at 80° C. under a pressure of 18 mm. of mercury. The residue from the distillation crystallized partially, and the addition of petroleum ether caused more crystals to form. The resulting mixture was filtered, and the crystals were washed with petroleum ether and dried to obtain 103 parts of 2-t-butyl-6-methallyl-4-methylphenyl N-methylcarbamate in the form of white crystals which, on recrystallization from benzene-petroleum ether, had a melting point of 103–104° C. The compound analyzed for 5.21% nitrogen, the theoretical amount being 5.09%.

Example 2

Following the procedure of Example 1, reaction was effected between 127 parts of 2-t-butyl-6-isobutenyl-4-methylphenol and 43.5 parts of methylisocyanate dissolved in 36.4 parts of toluene. After removal of the toluene solvent, as in Example 1, 152 parts of 2-t-butyl-6-isobutenyl-4-methylphenyl N-methylcarbamate was obtained. Upon crystallization from benzene-petroleum ether and two crystallizations from aqueous ethanol, the compound had a melting point of 136–137° C.

Example 3

The compounds of this invention were subjected to a screening test for evaluating pre-emergence herbicidal activity. To do this there was prepared an aqueous suspension containing 15 grams active compound per liter and spraying at the rate of 80 gallons per acre for a ten-pound-per-acre test on soil containing seeds which had been planted 24 hours earlier. A double spraying was used for a twenty-pound-per-acre test. The aqueous suspension was made by dissolving the particular compound to be tested in acetone to a concentration of 15 grams per 200 ml. acetone solution, adding Tween 20 (a sorbitol monolaurate polyoxyethylene derivative) to a concentration of 10 grams per 200 ml. of the acetone solution, and diluting the acetone solution with water to bring the concentration to 15 grams active compound per liter. For a two-pound-per-acre test, 100 ml. of the original formulation was taken and diluted to 1,000 ml. with a mixture composed of 20% acetone, 1% Tween 20, and 79% water, and the resulting formulation then was sprayed twice at the rate of 80 gallons per acre.

The seeds used in the screening tests were: millet (*Setaria sp.*); corn (*Zea mays*); curled mustard (*Brassica juncea*); and cotton (*Gossypium hirsutum*). After treatment the seeds were allowed to germinate and grow for a period of three weeks, and during this time the minimum temperatures were approximately 70° F. During the three-weeks period the seeds and seedlings were watered, the first two waterings being done by sprinkling in order to leach the chemical into the soil. Thereafter, water was applied by subirrigation. Data were taken three weeks after treatment. The numerical values given in the following table are based on a 0–10 rating scale in which 0 means no damage to the plants and 10 indicates complete kill of the plants.

TABLE 1

| Compound | Rate (lb./acre) | Species | | | |
|---|---|---|---|---|---|
| | | Millet | Corn | Mustard | Cotton |
| 2-t-butyl-6-methallyl-4-methyl-phenyl N-methyl-carbamate. | 2 | 2 | 0 | 0 | 0 |
| | 20 | 5 | 0 | 4 | 0 |
| 2-t-butyl-6-isobutenyl-4-methyl-phenyl N-methyl-carbamate. | 2 | 3 | 0 | 0 | 0 |
| | 20 | 7 | 0 | 4 | 0 |

Example 4

A further pre-emergence test for the compounds of this invention was carried out against crabgrass and wild oats, and there was included in this test a comparison with dimethyl-2,3,5,6-tetrachloroterephthalate. The results are given in the following table.

TABLE 2

| Compound | Rate (lb./acre) | Species | |
|---|---|---|---|
| | | Crabgrass | Wild Oats |
| 2-t-Butyl-6-methallyl-4-methyl-phenyl N-methylcarbamate. | 2 | 9 | 0 |
| | 10 | 10 | 0 |
| 2-t-Butyl-6-isobutenyl-4-methyl-phenyl N-methylcarbamate. | 2 | 4 | 0 |
| | 10 | 10 | 0 |
| Dimethyl-2,3,5,6-tetrachloroterephthalate. | 2 | 8 | 0 |
| | 10 | 10 | 2 |

The compounds of this invention are used in compositions for use as herbicides in liquid or solid form. The compounds may be used singly or in admixture. Solutions of the compounds, for example, may be used as liquids in solvents such as cyclohexanol, furfural, isobutyl alcohol, cyclohexanone, isopropyl acetate, and acetone and applied directly to the terrain in which annual weedy grasses normally grow. The compounds in solid form or solutions thereof in any of the above-mentioned solvents may be admixed with water using a suitable emulsifying agent to form an aqueous emulsion or suspension which is used as the carrier of the herbicide composition. The solid compound or liquid compound with solvent may also be extended by admixing with a solid carrier to form granules or dusts which are used as the herbicidal compositions. The dusts may be further extended by mixing with water and a surfactant. Granules and dusts may be made from any properly sized solids, preferably those that are readily available and low in price, such as talc, attapulgite, natural clays, pyrophyllite, diatomaceous earth, kaolin, aluminum and magnesium silicates, vermiculite, montmorillonite, and similar substances such as are used as carriers in the insecticide art.

Dusts are commonly produced from a dust former such as talc by blending the active ingredient with talc and further grinding the mixture of active compound and talc with more talc so as to obtain a fluid dust of particle size less than about 50 microns. Fullers earth is often substituted, and the active ingredient is often applied by spraying an organic solvent solution of the active compound of concentration in the range of 10 to 50%, evaporating the solvent and using the fullers earth mixture as a concentrate for further blending at the time of actual use. Similarly, the clays are often used for the same purpose and the concentrates are often used for producing suspensions in water which are readily sprayed over the area to be treated, in which case carboxymethylcellulose, methyl cellulose and other carbohydrate gums may be used to aid in maintaining the suspensions.

One of the preferred types of herbicidal compositions is that in which water is used as the major component and a compound of this invention is a minor component. The only drawback to this type of composition when used as a pre-emergence herbicide for annual weedy grasses is that it is not as easily and conveniently applied as is a granular formulation. Nevertheless, such aqueous dispersions may be prepared at the time of actual use so as to have a content of 0.5 to 10% of the active compound by dispersing a concentrate made up from about 10 to about 90% active compound, about 0.5 to 10% dispersing agent, and 0 to 90% inert diluent. Dispersing agents which are useful in such concentrates are the well-known surface active agents of the anionic, cationic or nonionic type and include alkali metal (sodium or potassium) oleates and similar soaps, amine salts of long chain fatty acids (oleates), sulfonated animal and vegetable oils (fish oils and castor oil), sulfonated petroleum oils, sulfonated acyclic hydrocarbons, sodium salts of lignin sulfonic acids, alkylnaphthalene sodium sulfonates, sodium lauryl sulfonate, disodium monolaurylphosphates, sorbitol laurate, pentaerythritol monostearate, glycerol monostearate, polyethylene oxides, ethylene oxide condensates of stearic acid, stearyl alcohol, stearyl amine, rosin amines, dehydroabietyl amine and the like, lauryl amine salts, dehydroabietyl amine salts, lauryl pyridinium bromide, stearyl trimethyl ammonium bromide, and cetyl dimethylbenzylammonium chloride. The aqueous dispersions may thus be made from the compounds themselves, from the compounds dissolved in water-soluble or water-insoluble solvent or from wettable dusts.

From the standpoint of ease of application and convenience in handling, the preferred type of herbicidal composition for use in accordance with this invention is that which is in the form of granules. Clay granules, for example, may be used as the carrier material and a solvent solution or aqueous dispersion of the active ingredient may be sprayed on the granules to provide a coating of the active ingredient. It also is possible to coat the granules with a dust formulation and then spray with a sticking agent to insure retention of the coating during handling and application. In granular formulations of the compounds of this invention, the amount of the compound may constitute from about 2.5 to about 50% by weight of the finished formulation, preferably from about 5 to about 20% by weight.

The active ingredients of the compositions are applied in an amount sufficient to exert the desired herbicidal action. For the selective control of crabgrass in accordance with this invention, the rate of application will be from about 2 to about 20 pounds per acre of the active compounds of this invention. The preferred amounts are in the range from about 5 to about 15 pounds per acre.

I claim:

1. A herbicidal composition comprising an effective amount of a compound having the structural formula

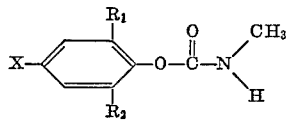

where $R_1$ is an alkyl group selected from the group consisting of t-butyl and t-amyl, $R_2$ is an alkenyl group selected from the group consisting of methallyl and isobutenyl, and X is a substituent selected from the group consisting of $CH_3-$, $CH_3O-$, $Cl-$, and $Br-$ in admixture with a dispersing material.

2. A herbicidal composition of claim 1 in which the compound is 2-t-butyl-6-methallyl-4-methylphenyl N-methylcarbamate.

3. A herbicidal composition of claim 1 in which the compound is 2-t-butyl-6-isobutenyl-4-methylphenyl N-methylcarbamate.

4. A herbicidal composition of claim 1 in which the dispersing material is a surface active dispersing agent.

5. A herbicidal composition of claim 1 in which the dispersing material is a major amount of a herbicidal carrier.

6. A herbicidal composition of claim 1 in which the dispersing material is a major amount of an inert, granular solid.

7. A herbicidal composition of claim 1 in which the dispersing material is a major amount of an inert, dispersible solid.

8. A herbicidal composition of claim 1 in which the dispersing material is a major amount of an inert, dispersible, volatile liquid.

9. The method of controlling annual weedy grasses which comprises contacting the soil in which said grasses grow, prior to emergence of said grasses, with a herbicidal amount of a compound having the structural formula

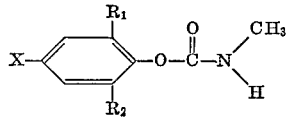

where $R_1$ is an alkyl group selected from the group consisting of t-butyl and t-amyl, $R_2$ is an alkenyl group selected from the group consisting of methallyl and isobutenyl, and X is a substituent selected from the group consisting of $CH_3-$, $CH_3O-$, $Cl-$, and $Br-$.

10. The method of claim 9 in which the annual weedy grass is crabgrass.

References Cited

UNITED STATES PATENTS

| | | |
|---|---|---|
| 3,046,302 | 6/1962 | Oja. |
| 3,107,261 | 10/1963 | Gesber et al. |
| 3,140,167 | 7/1964 | Haubein. |
| 3,206,502 | 9/1965 | Heiss et al. |
| 3,215,595 | 11/1965 | Bocker et al. |

JAMES O. THOMAS, JR., *Primary Examiner.*